United States Patent Office 2,806,672
Patented Sept. 17, 1957

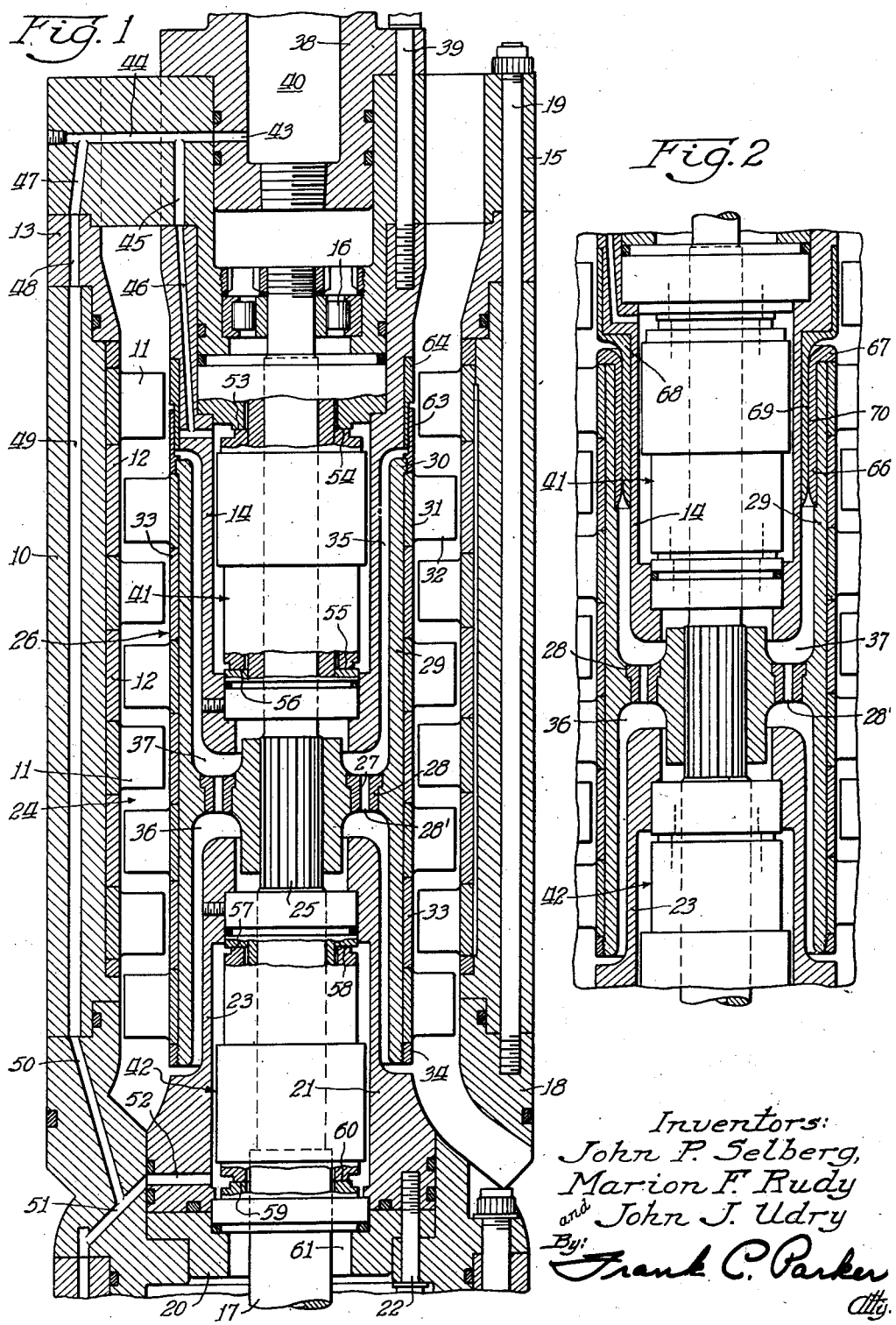

2,806,672

TURBINE ASSEMBLY

John P. Selberg, Los Angeles, John J. Udry, Van Nuys, and Marion F. Rudy, Northridge, Calif., assignors to Borg-Warner Corporation, a corporation of Illinois Application September 1, 1954, Serial No. 453,634

17 Claims. (Cl. 255—4.4)

The present invention relates to fluid driven turbines in general and is more particularly concerned with mud fluid driven turbines of the type utilized for driving earth bore drilling apparatus such as is disclosed in the patent to A. G. Bodine 2,554,005.

In mud fluid driven turbine assemblies of the type utilized to drive a vibration generator mechanism of an earth boring apparatus, such as is referred to above, it is desirable to provide means for cooling the rotary turbine elements and such cooling means utilize the flowing mud fluid itself as a means for carrying away excessive heat generated by friction between the mud fluid as it passes over the rotor blades. In this connection the turbine rotor is formed with a generally cylindrical portion supported by a laterally disposed annular mounting portion having mud fluid passages therein and the cylindrical portion of the rotor, together with the inner periphery of the turbine cavity, within which the rotor is disposed, forms a passage for by-passing a certain portion of the mud fluid so as to effect cooling of the turbine. With such turbine constructions, it is necessary to isolate the abrasive mud fluid from the interior regions of the turbine assembly which rotate with the turbine rotor. The copending application of Selbert, Rudy and Udry, Ser. No. 453,624, filed September 1, 1954, discloses such a sealing device utilizing a high pressure fluid lubricant maintained at a pressure substantially equal to the pressure of the mud fluid at a point disposed upstream from the turbine and this high pressure fluid lubricant acts on one side of two sealing devices which have the mud fluid acting on the other side thereof. These two sealing devices are respectively disposed above and below the fluid passages in the annular rotor mounting portion. In the sealing device disposed above the fluid passages in the rotor mount, the relative pressure differential between the pressure of the high pressure fluid lubricant and that of the mud fluid is so slight that the seal is not always as effective as is desirable in sealing out the mud fluid. The fluid passages in the rotor mount are small and act as restricted orifices which cause a pressure drop on the downstream side thereof. As a result, the pressure differential between the fluid lubricant and the by-passed mud fluid which acts on the sealing device disposed below the passages is sufficiently great to substantially insure that there will be no flow of mud fluid across the sealing device.

The present invention therefore has for an object, the provision of means for increasing the pressure drop of all of the by-passed mud fluid utilized for cooling the turbine rotor so as to provide the greater pressure differential across both sealing devices so as to better insure the sealing out of the mud fluid from the rotary turbine parts.

A more specific object of the present invention is to provide means for effecting a pressure drop in the mud fluid by-pass which comprises a restricted orifice therein and which is adapted to effect a pressure drop of the mud fluid downstream from the restricted orifice by an amount substantially equal to the entire pressure drop of the portion of the mud fluid which passes through the turbine assembly for effecting rotation of the rotor thereof.

A more detailed object of the present invention is to provide means on the cylindrical rotor portion comprising an annular ring cooperable with a complementary annular ring on the inner periphery of the turbine cavity, wherein the two annular rings together provide a restricted orifice for effecting a pressure drop in the mud fluid being bypassed between the turbine rotor mount and the inner periphery of the turbine cavity.

When the turbine assembly is utilized for the purpose of driving a vibration generator of the type disclosed in the aforesaid Bodine patent, wherein the vibration generator sets up axial vibrations in a massive elongated drill rod, the vibrations of the drill rod act on the column of mud fluid and cause out-of-phase pressure surges therein which travel in an upward direction in the column of mud fluid. It has been found that these pressure surges are of a magnitude of the order of 50 to 100 p. s. i., which, in the absence of the restricted orifice provided herein at the entrance to the mud fluid by-pass around the turbine, is a greater negative pressure differential than the positive differential of the pressure of the by-passed mud fluid relative to the high pressure fluid lubricant and is necessary to enable the sealing device to effect sealing. This is due to the fact that the additional pressure provided by the surges increases the mud pressure to a value substantially equal to or slightly greater than the pressure of the fluid lubricant and there is then a tendency for the mud fluid to leak across the sealing devices rather than for the fluid lubricant to leak across the sealing devices. By providing the greater pressure differential between the by-passed mud fluid and the fluid lubricant which acts upon the other side of the sealing devices, the effect of the out-of-phase pressure surges in the mud fluid is greatly minimized.

Further, the annular rings comprising the restricted orifice provides a damping effect on the pressure surges in the by-passed mud fluid resulting from the complementary and relatively closely fitting annular rings and this damping is effective to reduce the hydraulic energy losses in the turbine due to axial vibrations of the system. In the present invention the cooperable annular rings are disposed at the outer periphery of the rotor mount and as a result the out-of-phase pressure surges in the mud fluid do not act upon the laterally extending portion of the turbine rotor mount.

A further effect of the closely fitting annular rings which provide the restricted orifice for damping out the pressure surges in the mud fluid as it is passed through the by-pass around the turbine rotor, is to reduce the effect of mass unbalance, eccentricities, and any tendency of the rotor assembly to wobble while in operation. This is effected by the hydraulic damping between the annular rings and the tendency of the mud to maintain the two rings concentric with one another.

Since the two annular rings provide a positive pressure differential for both of the sealing devices, that is, the pressure of the mud fluid acting thereon is always less than the pressure of the fluid lubricant acting thereon, the life of the sealing devices is greatly increased. This is because it is more difficult for the mud fluid to seep between the sealing devices when the fluid lubricant pressure is the greater.

The foregoing objects and additional objects and advantages of the present invention will become apparent from the following detailed description when read in conjunction with the accompanying drawing, wherein:

Fig. 1 is a fragmental sectional view disclosing a mud fluid turbine of the type utilized for driving earth bore drilling apparatus, such as is disclosed in said Bodine Patent 2,554,005 and further showing a first embodiment of the present invention; and Fig. 2 is similar to Fig. 1 disclosing a second embodiment of the present invention and further disclosing only those features necessary to distinguish this embodiment of the invention from the first embodiment thereof disclosed in Fig. 1.

With reference now to the drawing, the embodiment of the invention disclosed in Fig. 1 will first be described. It will be understood that the present invention is particularly designed for use in conjunction with a mud fluid driven turbine of the type utilized for driving a vibration generator, such as is disclosed in the Bodine patent, which vibration generator is used for vibrating an elongated massive vibratory drill rod at substantial resonant frequencies thereof. It is further contemplated that the turbine assembly disclosed in Fig. 1 will be disposed within an outer sleeve (not shown) which comprises one section or sub of an elongated hollow drill pipe string suspended in an earth bore hole from a supporting derrick at the surface of the earth at the top of the bore hole.

It will be further understood that the present invention comprises an improvement in mud fluid driven turbines of the type disclosed in the copending application of Hatch and Wood, Ser. No. 462,158, filed October 14, 1954 which application discloses certain features disclosed herein. For a detailed description of certain features disclosed herein, but described only in sufficient detail to enable a full understanding of the present invention, reference should be had to said copending Hatch and Wood application which is hereby incorporated into the present application by reference.

Turning now to Fig. 1, a first relatively stationary sleeve member 10 is provided for mounting concentrically a plurality of stages of stator blades 11 which are held in axially fixed relation and properly spaced by means of a plurality of spacer rings 12. An annular member 13, as viewed in Fig. 1, is disposed immediately above the sleeve member 10 and is provided with an elongated flange portion 14. Another annular member 15 is disposed above the annular member 13 for mounting a suitable centralizing bearing 16 for holding a driven shaft 17 in concentric alignment therein at the upper end of the shaft.

Below the sleeve member 10 is an annular member 18 and the members 15, 13, 10 and 18 are all held together by a plurality of connecting rods 19. The annular member 18 supports a pair of annular members 20 and 21 which are secured thereto by a plurality of connecting bolts 22.

The annular member 21 is provided with an upwardly and axially extending flange 23 which, together with the downwardly and axially extending flange 14, forms the inner periphery of a turbine cavity 24, the outer periphery of which is formed by the sleeve 10 and the inner peripheries of the spacer rings 12 and the collars for the stator blades 11.

The turbine driving shaft 17 is held concentrically at a point located below the annular member 20 by means of a bearing (not shown) and is provided with splines 25 for the purpose of receiving an annular turbine rotor 26. The annular rotor 26 comprises a radially outwardly or laterally extending portion formed with suitable openings 27 therein, which openings are adapted to receive suitable bushings 28. Each of the bushings 28 is formed with a central aperture 28'. The rotor 26 also includes an annular generally cylindrical portion 29 which is disposed within the turbine cavity 24. The annular cylindrical portion 29 of the rotor 26 is provided with an upper radially outwardly extending flange 30 against which a mounting collar 31 of an upper stage of rotor blades 32 abuts. A plurality of stages of rotor blades 32 are provided, all of them being held in the proper axial position by means of suitable spacer rings 33 and all are held in place on the cylindrical portion 29 of the rotor 26 by means of a suitable external nut 34 which is threaded onto the lower end of the cylindrical portion 29 of the rotor.

It will be understood that during operation of the turbine assembly disclosed in Fig. 1, that is, when the turbine blades 32 are being driven by mud fluid passing through the turbine cavity 24, there will be a certain amount of friction between the mud fluid and the turbine rotor blades 32, as the mud fluid passes thereover. Consequently the turbine rotor cylindrical member 29 and the rotor 26 heat up due to this friction. In order to dissipate the heat, means are provided for by-passing a certain amount of the mud fluid between the turbine rotor cylindrical portion 29 and the flanges 14 and 23. This mud fluid by-pass is defined on the outer periphery by the inside of the rotor cylindrical portion 29 and is indicated by reference numeral 35. The inside of this fluid by-pass 35 is defined by the external periphery of the flange 14. The mud fluid then passes through the openings 28' in the bushings 28 and passes back into the mud stream below the cylindrical portion 29 by passing between the inner periphery of the turbine member 29 and the external periphery of flange 23.

It will be understood that the total cross-sectional area of the plurality of openings 28' through the laterally extending portions of the turbine rotor 26 is substantially less than the cross-sectional area of the by-pass 35 and, as a result, there would normally be a substantial pressure drop in the area 36 as compared to the pressure of the mud fluid above the bushing 28 and in the region 37.

An annular member 38 at the upper end of the turbine is in place by means of connecting bolts 39 which extend through suitable apertures formed in annular member 15 and annular member 13, and provides a suitable source of high pressure fluid lubricant within a hollow portion 40 thereof. This high pressure fluid lubricant is maintained at a pressure equal to the pressure of the mud fluid flowing down through the drill pipe string at a point immediately above the turbine cavity 24. The apparatus for pressurizing the high pressure fluid lubricant stored in cavity 40 is fully disclosed in said copending Hatch and Wood application. This high pressure mud fluid communicates with a sealing device 41 through suitable fluid passages indicated by reference numerals 43, 44, 45, 46 and with a sealing device 42 through passages 43, 44, 47, 48, 49, 50, 51 and 52. The fluid passages for supplying the high pressure fluid lubricant to the sealing devices 41 and 42 will not be described in further detail inasmuch as this portion of the present assembly is fully disclosed in the copending application of Selberg, Rudy and Udry Ser. No. 453,624, filed September 1, 1954. Likewise the sealing devices 41 and 42 are also fully disclosed in said copending Selberg, Rudy and Udry application. It will suffice at this point to state that the sealing devices 41 and 42 each comprise a high pressure seal and a low pressure seal. The high pressure seal of sealing device 41 comprises a pair of cooperable substantially optically flat annular sealing surfaces 53 and 54 which are effective to isolate the high pressure fluid lubricant within the outer portion of the chamber defined by flange 14 from a relatively low pressure fluid lubricant utilized for lubricating the bearings 16 and other bearings for concentrically mounting the shaft 17. The sealing device 41 also includes a low pressure seal comprising a pair of cooperable substantially optically flat annular sealing surfaces 55 and 56 which are utilized for isolating the mud fluid contained within region 37 from the high pressure fluid lubricant disposed within the flange 14 which houses the sealing device 41.

The sealing device 42 comprises a low pressure seal consisting of a pair of cooperable substantially optically flat annular sealing surfaces 57 and 58 for isolating mud fluid in the region 36 from the high pressure fluid lubricant within the flange 23. The sealing device 42 also includes a high pressure seal comprising a pair of cooperable substantially optically flat annular sealing surfaces 59 and 60 effective to isolate the high pressure fluid lubricant within the flange 23 from the low pressure fluid lubricant disposed within a cavity 61 and used for the purpose of lubricating various portions of the turbine assembly.

It will be understood that the pressure differential across the optical flats 53 and 54 of sealing device 41 and across the optical flats 59 and 60 of sealing device 42 may be of the order of several thousand p. s. i. and is a positive pressure differential in the direction extending from the high pressure fluid lubricant within the flanges 14 and 23 towards the low pressure fluid lubricant on the opposite sides of the optical flats. As a result, if there is any tendency for leakage across either of these pairs of optical flats it will be in the direction from high pressure fluid lubricant and, as a result, the optical flats will merely be better lubricated. Accordingly, no serious result will take place except the possible loss of a certain amount of the high pressure fluid lubricant in the event of leakage across either of the high pressure seals.

The low pressure seals of each of the sealing devices 41 and 42 are confronted with a much more serious problem in that the high pressure mud fluid lubricant must be effective to keep the mud fluid out of the region within which the sealing devices 41 and 42 are disposed. Due to the effect of the openings 28' in the bushings 28 there is normally a tendency for there to be a pressure drop across these openings, the openings functioning as restricted orifices in the mud fluid by-pass extending between the inner periphery of the flange 29 and the outer periphery of the flanges 14 and 23. Thus there is a tendency for the pressure of the mud fluid in the region 37 to be higher than the pressure of the mud fluid within the region 36. As a result, the pressure of the mud fluid in the region 37 is more nearly equal to the pressure of the high pressure fluid lubricant disposed around the sealing device 41 whereas there is a greater positive differential between the pressure of the fluid lubricant in the sealing device 42 and the pressure of the mud fluid in the region 36. Due to this greater positive pressure differential across the optical flats 57 and 58 there is a tendency for the fluid lubricant to seep between these two optical flat surfaces into the mud fluid, so that there is a little or no damage to the optical flats in the event of leakage across the sealing surfaces.

Due to the fact that the mud fluid flowing through the turbine cavity 24 is subject to superimposed pressure surges, caused by the vibrating drill rod, of a magnitude substantially equal to the amount of pressure drop across the restricted orifice 28', these pressure surges would normally be effective to provide instantaneous inverted pressure gradients across the optical flat surfaces 55 and 56 which would actually cause a flow to take place from the mud fluid into the high pressure fluid lubricant. Obviously, this is most undesirable and the present invention includes means for preventing such an occurrence which will now be described.

In order to provide a sufficient pressure drop within the mud fluid by-pass 35 extending between the cylindrical portion 29 of the turbine rotor and the flange 14, the cylindrical portion 29 of the turbine rotor is provided with an integral annular ring 63 made of some suitable wear-resistant material and this ring 63 cooperates with a complementary annular ring 64 secured around the outer periphery of flange 14. The inner periphery of the annular ring 63 and the outer periphery of the annular ring 64 are radially spaced slightly but are sufficiently close together that the cross-sectional area of the total space between the rings is substantially less than the cross-sectional area of the portion of the mud fluid by-pass which extends between the portion 29 of the turbine rotor and the flange 14. Thus the effect of the annular opening between the annular rings 63 and 64 is to provide an annular restricted orifice in the mud fluid by-pass and, as a result, a substantial pressure drop occurs immediately beneath the annular rings 63 and 64, with the pressure drop immediately beneath the restricted openings 28' being much less relatively. As a result, the mud fluid pressure in the region 37 is substantially the same as that in the region 36 so that the optical flats 55 and 56 are no longer subject to instantaneous inverted pressure gradients which tend to cause mud fluid flow across the optical flats 55 and 56. As a result there is always a positive pressure differential across optical flats 55 and 56 in the direction extending from the high pressure fluid lubricant toward the mud fluid and this insures that any leakage will be of the fluid lubricant into the mud fluid.

The restricted opening provided between the annular rings 63 and 64, in addition to providing a pressure drop within the mud fluid by-pass, also has the effect of damping the mud pressure surges in the mud fluid by-pass and this is effective to reduce the hydraulic energy losses in the turbine due to axial vibration of the system.

The annular rings 63 and 64, being disposed radially outwardly at a point in alignment with the outer periphery of the cylindrical portion 29 of the rotor 26, the lateral or radially outwardly extending regions or portions of the rotor are no longer subjected to the pressure surges in the mud fluid in the turbine cavity 24. This effects a stabilizing of the turbine rotor mount.

Although pressure surges exist both upstream and downstream with respect to the turbine, those that are created upstream are in a considerable higher pressure area and represent a much larger energy loss than those in the relatively lower pressure mud fluid below the turbine. This is due to the fact that there is a substantial pressure drop across the turbine. The pressure surges created below the turbine are swept down the mud stream and do not represent an energy loss to the fluid system whereas those created upstream of the turbine move counter to the mud flow and represent a complete loss of hydraulic energy. The energy of the counter flow upstream surges is dissipated in heat, turbulence, and friction losses.

A further distinct advantage provided by the two annular rings 63 and 64 arises from the fact that the mud fluid, in passing therethrough, tends to maintain the two rings concentric with respect to one another and this, thus is effective in reducing the mass unbalance, eccentricities and any tendencies of the rotor to wobble while in operation.

Turning now to the second embodiment of the present invention which is disclosed in Fig. 2, only those features which are different in the two embodiments will be described in detail. Those parts of Fig. 2 which are identical with Fig. 1 have been given identical reference numerals and are not further described. The only change in Fig. 2 of a substantial nature over that which is disclosed in Fig. 1 involves the shape and disposition of the annular rings forming the restricted opening which effects the pressure drop in the mud fluid by-pass. In Fig. 2, the annular rings comprise a first annular ring 66, suitably secured to the inner periphery of the cylindrical portion 29 of the rotor, which has a radially outwardly extending portion 67 which takes the place of the radially outwardly extending flange 30 in Fig. 1 for holding the rotor blades in the proper position. The annular ring on the flange 14 comprises a member 68 suitably secured to the flange 14 and the two annular rings 66 and 68 are each provided with complementary facing surfaces 69 and 70 which are located in radially spaced relation for providing a restricted opening which functions to insure a pressure drop in all of the mud fluid which passes into the space between the cylindrical portion 29 of the rotor and the external periphery of the flange 14. As a result, the mud fluid in the chamber 37 is reduced with respect to the pressure of the high pressure fluid lubricant within the flange 14 just as is the case in the Fig. 1 embodiment of the invention.

All of the advantages attributable to the embodiment of the invention disclosed in Fig. 1 are equally applicable to the embodiment disclosed in Fig. 2 and it is contemplated that numerous changes and modifications may be made in the present invention without departing from the spirit or scope thereof.

What is claimed is:

1. A turbine assembly including a turbine rotor adapted to be driven by a driving fluid which is subject to superimposed pressure surges, said turbine assembly comprising a turbine housing and means for rotatably mounting a driving shaft within said housing, differential pressure actuated sealing devices for isolating the driving fluid from the driving shaft mounting means, means providing a source of fluid lubricant at a pressure substantially equal to the pressure of the driving fluid at a point disposed upstream from the turbine assembly, means forming a driving fluid by-pass establishing communication with one side of said sealing devices, means establishing communication from said fluid lubricant source to the opposite side of said sealing devices and the effectiveness of said sealing devices in isolating the driving fluid from the driving shaft mounting being generally proportional to the positive pressure differential across said sealing devices in the direction extending from the lubricant to the driving fluid, and means defining a restricted orifice disposed in said driving fluid by-pass at a point located upstream from said sealing devices and effective to reduce the pressure of the driving fluid acting on said sealing devices by an amount in excess of the maximum value of the superimposed pressure surges for at all times insuring a positive pressure differential across said sealing devices in the direction extending from the lubricant to the driving fluid.

2. A turbine assembly including a turbine rotor adapted to be driven by a driving fluid which is subject to superimposed pressure surges, said turbine assembly comprising a turbine housing and means rotatably mounting a driving shaft within said housing, differential pressure actuated sealing devices for isolating the driving fluid from the driving shaft mounting means, means providing a source of fluid lubricant at a pressure substantially equal to the pressure of the driving fluid at a point disposed upstream from the turbine assembly, said turbine rotor and said turbine housing including radially spaced substantially concentric sleeve-like members forming a driving fluid by-pass establishing communication with one side of said sealing devices, means establishing communication from said fluid lubricant source to the opposite side of said sealing devices and the effectiveness of said sealing devices in isolating the driving fluid from the driving shaft mounting being generally proportional to the positive pressure differential across said sealing devices in the direction extending from the lubricant to the driving fluid, and means defining a restricted orifice disposed at the entrance to said driving fluid by-pass and effective to reduce the pressure of the driving fluid acting on the sealing devices by an amount in excess of the maximum value of the superimposed pressure surges for at all times insuring a positive pressure differential across said sealing devices in the direction extending from the lubricant to the driving fluid.

3. A turbine assembly including a turbine rotor adapted to be driven by a driving fluid which is subject to superimposed pressure surges, said turbine assembly comprising a turbine housing and means for rotatably mounting a driving shaft within said housing, differential pressure actuated sealing devices for isolating the driving fluid from the driving shaft mounting means, means providing a source of fluid lubricant at a pressure substantially equal to the pressure of the driving fluid at a point disposed upstream from the turbine assembly, said turbine rotor and said turbine housing including radially spaced substantially concentric sleeve-like members forming a driving fluid by-pass establishing communication with one side of said sealing devices, means establishing communication from said fluid lubricant source to the opposite side of said sealing devices and the effectiveness of said sealing devices in isolating the driving fluid from the driving shaft mounting being generally proportional to the positive pressure differential across said sealing devices in the direction extending from the lubricant to the driving fluid, and means defining a restricted orifice disposed in said driving fluid by-pass at a point located upstream from said sealing devices and effective to reduce the pressure of the driving fluid acting on said sealing devices by an amount in excess of the maximum value of the superimposed pressure surges for at all times insuring a positive pressure differential across said sealing devices in the direction extending from the lubricant to the driving fluid.

4. A turbine assembly including a turbine rotor adapted to be driven by a driving fluid which is subject to superimposed pressure surges, said turbine assembly comprising a turbine housing and means for rotatably mounting a driving shaft within said housing, differential pressure actuated sealing devices for isolating the driving fluid from the driving shaft mounting means, means providing a source of fluid lubricant at a pressure substantially equal to the pressure of the driving fluid at a point disposed upstream from the turbine assembly, said turbine rotor and said turbine housing including radially spaced substantially concentric sleeve-like members forming a driving fluid by-pass establishing communication with one side of said sealing devices, means establishing communication from said fluid lubricant source to the opposite side of said sealing devices and the effectiveness of said sealing devices in isolating the driving fluid from the driving shaft mounting being generally proportional to the positive pressure differential across said sealing devices in the direction extending from the lubricant to the driving fluid, and annular ring means associated with said sleeve-like members and defining a restricted orifice disposed in the vicinity of the entrance to said driving fluid by-pass and effective to reduce the pressure of the driving fluid in the by-pass which acts on the sealing devices by an amount in excess of the maximum value of the superimposed pressure surges for at all times insuring a positive pressure differential across said sealing devices in the direction extending from the lubricant to the driving fluid.

5. A turbine assembly including a turbine rotor adapted to be driven by a driving fluid which is subject to superimposed pressure surges, said turbine assembly comprising a turbine housing and means for rotatably mounting a driving shaft within said housing, differential pressure actuated sealing devices for isolating the driving fluid from the driving shaft mounting means, means providing a source of fluid lubricant at a pressure substantially equal to the pressure of the driving fluid at a point disposed upstream from the turbine assembly, said turbine rotor and said turbine housing including radially spaced substantially concentric sleeve-like members forming a driving fluid by-pass establishing communication with one side of said sealing devices, means establishing communication from said fluid lubricant source to the opposite side of said sealing devices and the effectiveness of said sealing devices in isolating the driving fluid from the driving shaft mounting being generally proportional to the positive pressure differential across said sealing devices in the direction extending from the lubricant to the driving fluid, and means comprising a pair of cooperable concentric annular rings disposed in the vicinity of the entrance to said driving fluid by-pass and respectively carried by said radially spaced concentric sleeve-like members, the radial spacing between said cooperable annular rings being less than the radial spacing between said concentric sleeve-like members and thereby defining an annular restricted orifice effective to reduce the pressure of the driving fluid in the by-pass and downstream from the orifice by an amount in excess of the maximum value of the superimposed pressure surges for at all times insuring a positive pressure differential across said sealing devices in the direction extending from the lubricant to the driving fluid.

6. A turbine assembly including a turbine rotor adapted to be driven by a driving fluid which is subject to superimposed pressure surges, said turbine assembly comprising a turbine housing and means for rotatably mounting a driving shaft within said housing, differential pressure actuated sealing devices for isolating the driving fluid from the driving shaft mounting means, means providing a source of fluid lubricant at a pressure substantially equal to the pressure of the driving fluid at a point disposed upstream from the turbine assembly, said turbine rotor and said turbine housing including radially spaced substantially concentric sleeve-like members forming a driving fluid by-pass establishing communication with one side of said sealing devices, means establishing communication from said fluid lubricant source to the opposite side of said sealing devices and the effectiveness of said sealing devices in isolating the driving fluid from the driving shaft mounting being generally proportional to the positive pressure differential across said sealing devices in the direction extending from the lubricant to the driving fluid, and said sleeve-like members including opposed annular rings respectively formed thereon and disposed radially between the sleeve-like members in the vicinity of the entrance to said driving fluid by-pass, the radial spacing between said annular rings being less than the radial spacing between the concentric sleeve-like members and thereby defining an annular restricted orifice effective to reduce the pressure of the driving fluid in the by-pass and downstream from the orifice by an amount in excess of the maximum value of the superimposed pressure surges for at all times insuring a positive pressure differential across said sealing devices in the direction extending from the lubricant to the driving fluid.

7. A turbine assembly including a turbine rotor adapted to be driven by a driving fluid which is subject to superimposed pressure surges, said turbine assembly comprising a turbine housing and means for rotatably mounting a driving shaft within said housing, differential pressure actuated sealing devices for isolating the driving fluid from the driving shaft mounting means, means providing a source of fluid lubricant at a pressure substantially equal to the pressure of the driving fluid at a point disposed upstream from the turbine assembly, said turbine rotor and said turbine housing including radially spaced substantially concentric sleeve-like members forming a driving fluid by-pass establishing communication with one side of said sealing devices, means establishing communication from said fluid lubricant source to the opposite side of said sealing devices and the effectiveness of said sealing devices in isolating the driving fluid from the driving shaft mounting being generally proportional to the positive pressure differential across said sealing devices in the direction extending from the lubricant to the driving fluid, and said sleeve-like members including opposed annular rings respectively formed thereon and disposed slightly upstream from the entrance to said driving fluid by-pass, the radial spacing between said annular rings being less than the radial spacing between the concentric sleeve-like members and thereby defining an annular restricted orifice effective to reduce the pressure of the driving fluid in the by-pass and downstream from the orifice by an amount in excess of the maximum value of the superimposed pressure surges for at all times insuring a positive pressure differential across said sealing devices in the direction extending from the lubricant to the driving fluid.

8. A fluid driven turbine assembly comprising means forming a substantially annular turbine cavity, a shaft disposed concentrically within said turbine cavity forming means and having means associated therewith for mounting the shaft for rotation with respect to said turbine cavity forming means, a turbine rotor connected with said shaft and disposed within said turbine cavity and effective to drive said shaft upon the passage of pressurized fluid through the turbine cavity, a source of fluid lubricant maintained at a pressure substantially equal to the turbine driving fluid pressure at a point located upstream from the turbine rotor, said turbine rotor and the inner periphery of said annular turbine cavity together defining fluid passage means for by-passing a portion of the turbine driving fluid around the turbine rotor for cooling the same, differential pressure actuated sealing devices adapted to have the pressurized fluid lubricant act on one side thereof and the by-passed turbine driving fluid act on the other side thereof for isolating the by-passed turbine driving fluid from the shaft mounting means and dependent for effectiveness in so isolating the shaft mounting means from the turbine driving fluid upon a substantially greater fluid lubricant pressure than the pressure of the by-passed turbine driving fluid, and means disposed in said by-passing means at a point upstream from said sealing devices and defining a restricted orifice through which the by-passed turbine driving fluid must pass for thereby providing a substantial reduction in the pressure of the by-passed turbine driving fluid which acts on said other side of said sealing devices for maintaining the effectiveness of said sealing devices in isolating the turbine driving fluid from the shaft mounting means.

9. A fluid driven turbine assembly comprising means forming a substantially annular turbine cavity, a shaft disposed concentrically within said turbine cavity forming means and having means associated therewith for mounting the shaft for rotation with respect to said turbine cavity forming means, a turbine rotor connected with said shaft and disposed within said turbine cavity and effective to drive said shaft upon the passage of pressurized fluid through the turbine cavity, a source of fluid lubricant maintained at a pressure substantially equal to the turbine driving fluid pressure at a point located upstream from the turbine rotor, said turbine rotor and the inner periphery of said annular turbine cavity being radially spaced from each other and together defining fluid passage means for by-passing a portion of the turbine driving fluid around the turbine rotor for cooling the same, differential pressure actuated sealing devices adapted to have the pressurized fluid lubricant act on one side thereof and the by-passed turbine driving fluid act on the other side thereof for isolating the by-passed turbine driving fluid from the shaft mounting means and dependent for effectiveness in so isolating the shaft mounting means from the turbine driving fluid upon a substantially greater fluid lubricant pressure than the pressure of the by-passed turbine driving fluid, and means disposed in said by-passing means at a point upstream from said sealing devices and defining an annular restricted orifice through which the by-passed turbine driving fluid must pass for thereby providing a substantial reduction in the pressure of the by-passed turbine driving fluid which acts on said other side of said sealing devices for maintaining the effectiveness of said sealing devices in isolating the turbine driving fluid from the shaft mounting means.

10. A fluid driven turbine assembly comprising means forming a substantially annular turbine cavity, a shaft disposed concentrically within said turbine cavity forming means and having means associated therewith for mounting the shaft for rotation with respect to said turbine cavity forming means, a turbine rotor connected with said shaft and disposed within said turbine cavity and effective to drive said shaft upon the passage of pressurized fluid through the turbine cavity, a source of fluid lubricant maintained at a pressure substantially equal to the turbine driving fluid pressure at a point located upstream from the turbine rotor, said turbine rotor and the inner periphery of said annular turbine cavity being radially spaced from each other and together defining fluid passage means for by-passing a portion of the turbine driving fluid around the turbine rotor for cooling the same, differential pressure actuated sealing devices adapted to have the pressurized fluid lubricant act on one side thereof and the by-passed turbine driving fluid act on the other side thereof for isolating the by-passed turbine driving fluid from the shaft mounting means and dependent for effectiveness in so isolating the shaft mounting means from the turbine driving fluid upon a substantially greater fluid lubricant pressure than the pressure of the by-passed turbine driving fluid, and means comprising a pair of annular rings disposed in said by-passing means at a point upstream from said sealing devices and being radially spaced from each other by a lesser amount than the space between said turbine rotor and the inner periphery of said annular turbine cavity and thereby defining an annular restricted orifice through which the by-passed turbine driving fluid must pass for thereby providing a substantial reduction in the pressure of the by-passed turbine driving fluid which acts on said other side of said sealing devices for maintaining the effectiveness of said sealing devices in isolating the turbine driving fluid from the shaft mounting means.

11. A mud fluid driven turbine adapted to drive a vibration generator for resonantly vibrating an elongated massive drill rod of a vibratory earth boring drill and comprising means forming a substantially annular turbine cavity, a shaft for actuating said generator and disposed concentrically within said turbine cavity forming means and having means associated therewith for mounting the shaft for rotation with respect to said turbine cavity forming means, a turbine rotor connected with said shaft and disposed within said turbine cavity and effective to drive said shaft upon the passage of pressurized mud fluid through the turbine cavity, a source of fluid lubricant maintained at a pressure substantially equal to the mud fluid pressure at a point located upstream from the turbine rotor, said turbine rotor and the inner periphery of said annular turbine cavity together defining fluid passage means for by-passing a portion of the mud fluid around the turbine rotor for cooling the same, differential pressure actuated sealing devices adapted to have the pressurized fluid lubricant act on one side thereof and the by-passed fluid act on the other side thereof for isolating the by-passed mud fluid from the shaft mounting means and dependent for effectiveness in so isolating the shaft mounting means from the mud fluid upon a substantially greater fluid lubricant pressure than the pressure of the by-passed mud fluid, and means disposed in said by-passing means at a point upstream from said sealing devices and defining a restricted orifice through which the by-passed mud fluid must pass for thereby providing a substantial reduction in the pressure of the by-passed mud fluid which acts on said other side of said sealing devices for maintaining the effectiveness of said sealing devices in isolating the mud fluid from the shaft mounting means.

12. A turbine assembly including a turbine rotor adapted to be driven by a driving fluid which is subject to superimposed vertically moving pressure surges, said turbine assembly comprising a turbine housing and a driving shaft rotatably mounted within said housing, said turbine rotor having a rotor mount and thereby being connected with said shaft and said rotor being disposed within said turbine housing, means forming a driving fluid by-pass for by-passing a portion of the driving fluid around the rotor and through said rotor mount for thereby cooling the same, and slightly radially spaced annular ring means respectively disposed on said rotor and on said housing and defining a restricted orifice disposed at the entrance to said driving fluid by-pass, said restricted orifice being effective to dampen the vertically moving pressure surges in the driving fluid which flows through said by-pass for thereby preventing the application of said surges to said turbine rotor mount so as to minimize vibration of and thereby stabilize the rotor.

13. A fluid driven turbine assembly adapted to be actuated by a driving fluid which is subject to superimposed vertically moving pressure surges and comprising means forming a substantially annular turbine cavity, a shaft disposed concentrically within said turbine cavity forming means and having means associated therewith for mounting the shaft for rotation with respect to said turbine cavity forming means, a turbine rotor connected with said shaft and disposed within said turbine cavity and effective to drive said shaft upon the passage of said driving fluid through the turbine cavity, said turbine rotor comprising a laterally extending portion fixed to said shaft and extending radially outwardly into said turbine cavity and an integral annular cylindrical portion which with the inner periphery of said annular turbine cavity together define fluid passage means for by-passing a portion of the turbine driving fluid around the turbine rotor for cooling the same, and means disposed in said by-passing means at the entrance thereto and defining a restricted orifice through which the by-passed turbine driving fluid must pass for thereby damping the pressure surges in the by-passed driving fluid so as to prevent the application of the pressure surges to the laterally extending portion of the rotor so as to minimize vibration of and thereby stabilize the rotor.

14. A fluid driven turbine assembly adapted to be actuated by a driving fluid which is subject to superimposed vertically moving pressure surges and comprising means forming a substantially annular turbine cavity, a shaft disposed concentrically within said turbine cavity forming means and having means associated therewith for mounting the shaft for rotation with respect to said turbine cavity forming means, a turbine rotor connected with said shaft and disposed within said turbine cavity and effective to drive said shaft upon the passage of said driving fluid through the turbine cavity, said turbine rotor comprising a laterally extending portion fixed to said shaft and extending radially outwardly into said turbine cavity and an integral annular cylindrical portion which with the inner periphery of said annular turbine cavity together define fluid passage means for by-passing a portion of the turbine driving fluid around the turbine rotor for cooling the same, and slightly radially spaced annular ring means respectively disposed on said cylindrical portion of the rotor and on said inner periphery of said turbine cavity, said annular ring means being disposed in said by-passing means at the entrance thereto and defining a restricted orifice through which the by-passed turbine driving fluid must pass for thereby damping the pressure surges in the by-passed driving fluid so as to prevent the application of the pressure surges to the laterally extending portion of the rotor so as to minimize vibration of and thereby stabilize the rotor.

15. A fluid driven turbine adapted to drive a vibration generator for resonantly vibrating an elongated massive drill rod of a vibratory earth boring drill and adapted to be actuated by mud fluid which is subject to superimposed vertically moving pressure surges and comprising means forming a substantially annular turbine cavity, a shaft disposed concentrically within said turbine cavity forming means and having means associated therewith for mounting the shaft for rotation with respect to said turbine cavity forming means, a turbine rotor connected with said shaft and disposed within said turbine cavity and effective to drive said shaft upon the passage of said mud fluid through the turbine cavity, said turbine rotor comprising a laterally extending portion fixed to said shaft and extending radially outwardly into said turbine cavity and an integral annular cylindrical portion which with the inner periphery of said annular turbine cavity together define mud fluid passage means for by-passing a portion of the mud fluid around the turbine rotor for cooling the same, and slightly radially spaced annular ring means respectively disposed on said cylindrical portion of the rotor and on said inner periphery of said turbine cavity, said annular ring means being disposed in said by-passing means at the entrance thereto and defining a restricted orifice through which the by-passed mud fluid must pass for thereby damping the pressure surges in the by-passed mud fluid so as to prevent the application of the pressure surges to the laterally extending portion of the rotor so as to minimize vibration of and thereby stabilize the rotor.

16. A fluid driven turbine assembly adapted to be actuated by a driving fluid which is subject to superimposed vertically moving pressure surges and comprising means forming a substantially annular turbine cavity, a shaft disposed concentrically within said turbine cavity forming means and having means associated therewith for mounting the shaft for rotation with respect to said turbine cavity forming means, a turbine rotor connected with said shaft and disposed within said turbine cavity and effective to drive said shaft upon the passage of said driving fluid through the turbine cavity, said turbine rotor comprising a laterally extending portion fixed to said shaft and extending radially outwardly into said turbine cavity and an integral annular cylindrical portion which with the inner periphery of said annular turbine cavity together define fluid passage means for by-passing a portion of the turbine driving fluid around the turbine rotor for cooling the same, and slightly radially spaced annular ring means respectively disposed on said cylindrical portion of the rotor and on said inner periphery of said turbine cavity, said annular ring means being disposed in said by-passing means at the entrance thereto and defining a restricted orifice through which the by-passed turbine driving fluid must pass for thereby damping the pressure surges in the by-passed driving fluid so as to substantially confine the pressure surges to the region of the turbine cavity disposed radially outwardly with respect to the annular cylindrical portion of the turbine rotor and thus prevent the application of the pressure surges to the laterally extending portion of the rotor and consequently minimize vibration thereof.

17. A fluid driven turbine adapted to drive a vibration generator for reasonantly vibrating an elongated massive drill rod of a vibratory earth boring drill and adapted to be actuated by pressurized mud fluid which is subject to superimposed vertically moving pressure surges and comprising means forming a substantially annular turbine cavity, a shaft disposed concentrically within said turbine cavity forming means and having means associated therewith for mounting the shaft for rotation with respect to said turbine cavity forming means, a turbine rotor connected with said shaft and disposed within said turbine cavity and effective to drive said shaft upon the passage of said mud fluid through the turbine cavity, said turbine rotor comprising a laterally extending portion fixed to said shaft and extending readially outwardly into said turbine cavity and an integral annular cylindrical portion which with the inner periphery of said annular turbine cavity together define mud fluid passage means for by-passing a portion of the mud fluid around the turbine rotor for cooling the same, and slightly radially spaced annular ring means respectively disposed on said cylindrical portion of the rotor and on said inner periphery of said turbine cavity, said annular ring means being disposed in said by-passing means at the entrance thereto and defining a restricted orifice through which the by-passed mud fluid must pass for thereby damping the pressure surges in the by-passed mud fluid so as to substantially confine the pressure surges to the region of the turbine cavity disposed radially outwardly with respect to the annular cylindrical portion of the turbine rotor and thus prevent the application of the pressure surges to the laterally extending portion of the rotor and consequently minimize vibration thereof.

References Cited in the file of this patent

UNITED STATES PATENTS

| | | |
|---|---|---|
| 1,482,702 | Scharpenberg | Feb. 5, 1924 |
| 2,371,248 | McNamara | Mar. 13, 1945 |